UNITED STATES PATENT OFFICE.

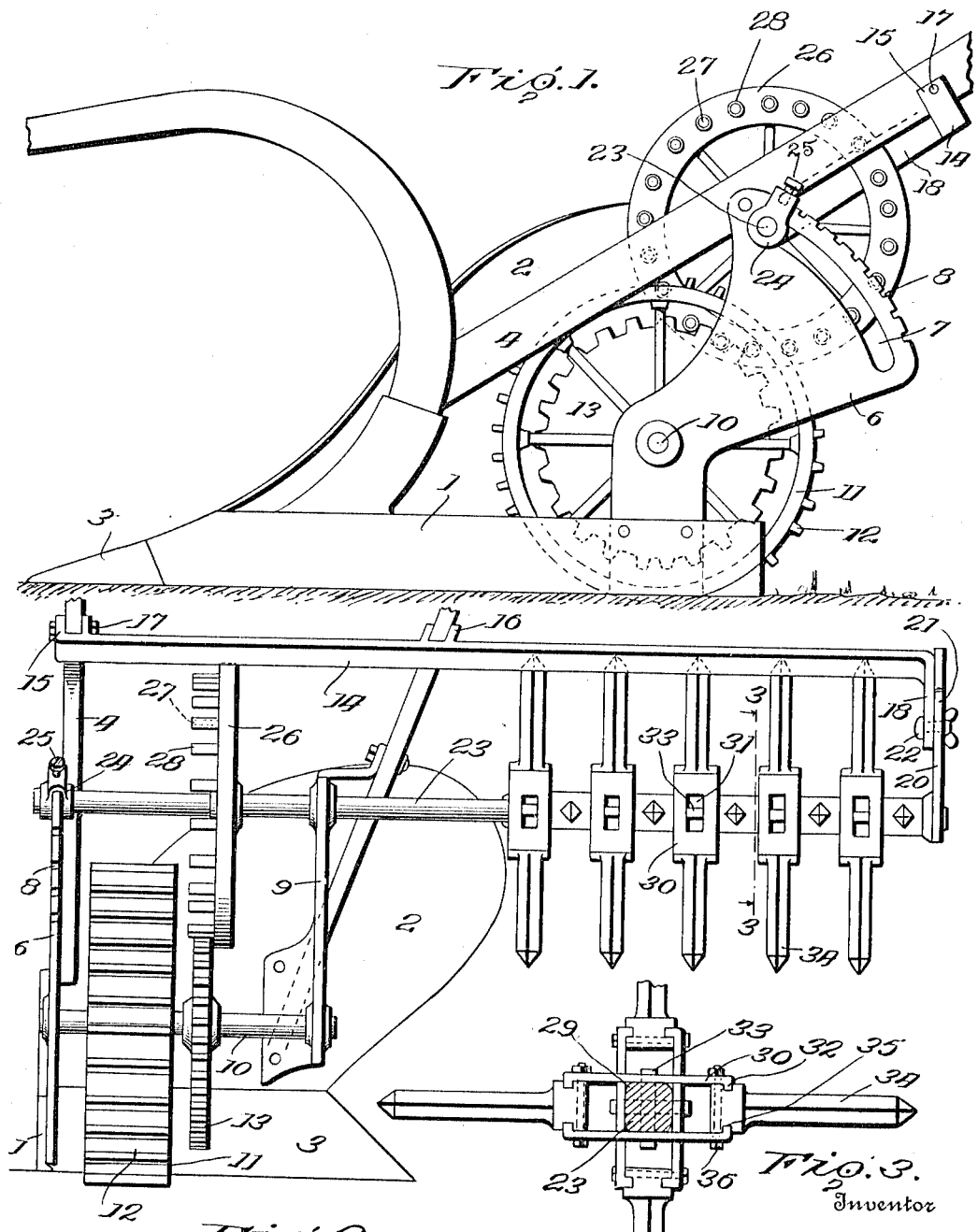

ALFRED L. GARLOUGH, OF ST. PAUL, MINNESOTA.

HARROW ATTACHMENT FOR PLOWS.

1,063,868.  Specification of Letters Patent.  Patented June 3, 1913.

Application filed January 9, 1912. Serial No. 670,270.

*To all whom it may concern:*

Be it known that I, ALFRED L. GARLOUGH, citizen of the United States, residing at St. Paul, in the county of Ramsey and State of Minnesota, have invented certain new and useful Improvements in Harrow Attachments for Plows, of which the following is a specification.

This invention relates to harrow attachments especially adapted to be used in conjunction with breaking or turning plows, and has for its object to provide an attachment of simple structure which may be easily and quickly applied to the plow and which will operate upon the soil as the same is being turned for the purpose of pulverizing the same, whereby a fine dust mulch is produced at the surface of the soil after the plowing operation.

A further object of the invention is to provide in an attachment of the character indicated means for whipping or beating the soil so that the reduction of the same to fine particles may be more readily and quickly accomplished.

Another object of the invention is to provide means for holding the attachment so that the soil engaging members will operate at a desired depth in the furrow slice as it is turned by the plow.

While the attachment is designed primarily to be used in connection with a turning or breaking plow as indicated, it may be applied equally as advantageously to a cultivator or other soil working implement or machine.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention reference is to be had to the following description and accompanying drawings, in which:—

Figure 1 is a side elevation of a plow with the harrow attachment applied; Fig. 2 is a rear elevation of the same; Fig. 3 is a transverse sectional view of a part of the attachment cut on the line 3—3 of Fig. 2.

Corresponding and like parts are referred to in the following description and indicated in all the views of the accompanying drawings by the same reference characters.

As illustrated in the accompanying drawings the harrow attachment is shown applied to a breaking plow which includes a landside plate 1, moldboard 2, share 3 and handles 4 of the usual pattern and arrangement.

The attachment includes a plate 6 which is secured at its upper portion to one of the handles 4 and at its lower portion to the landside plate 1. This plate is provided with an arcuate slot 7 and upon its upper portion with a series of indentations 8. A similar plate 9 is secured to the moldboard 2 at its lower portion and to the other handle 4 at its upper portion. This plate is provided with an arcuate slot which corresponds with the slot 7 in the plate 6, but the plate 9 is devoid of indentations at its upper edge portion. The plates 6 and 9 are in parallel relation to each other and spaced from each other. A shaft 10 is journaled at its ends in the plates 6 and 9. A traction wheel 11 is fixed to the shaft 10 between the plates 6 and 9 and is provided upon its periphery with a series of tractors 12 of any suitable size and length. A gear wheel 13 is fixed to the shaft 10 at one side of the traction wheel 11.

A bar 14 is provided with two sets of lugs 15 and 16. These lugs are adapted to receive between them handles 4, and securing bolts 17 pass transversely through each pair of lugs and each handle 4. The bar 14 projects beyond the handle 4 which is located at the furrow slice side of the plow and at its extremity is angularly disposed, as at 18. A plate 20 is provided with an elongated slot 21 which receives a bolt 22. The said bolt 22 is screw threaded into engagement with the extremity 18 of the bar 14. The outer end of a shaft 23 is journaled at the lower rear end of the plate 21 and the inner portion of the shaft 23 passes through the arcuate slots in the plates 6 and 9 and the inner end of the said shaft is journaled in a bearing 24 which is slidably mounted upon the plate 6. A set screw 25 passes through the side of the bearing 24 and is adapted to be engaged with any one of the indentations 8 provided at the upper edge of the said plate 6.

A wheel 26 is fixed to the shaft 23 at a point between the plates 6 and 9 and is provided at one side with a series of outstanding pins 27 upon each one of which is loosely journaled a roller 28. These rollers 28 are adapted to engage between the teeth of the wheel 13. Beyond the plate 9 the shaft 23 is approximately square in transverse section with rounded corner portions indicated at 29.

The soil engaging members of the attachment are all mounted upon the non-circular outer portion of the shaft 23 and as all of these members are of the same structure and arrangement, a description of one will suffice.

Each soil engaging member includes a pair of resilient plates 30, the plates being provided at points midway between their ends with longitudinally disposed slots 31 and being provided at their ends with inturned extremities 32. The members of each pair are positioned one at each side of the shaft 23, and pins 33 pass transversely through the shaft and are located at their end portions in the slots 31 of the plates. These pins 33 are designed to prevent the plates from having excessive movement longitudinally, but will permit slight longitudinal movement of the said plates in order that they may flex or bend when they are subjected to strain during the operation of beating or breaking the soil. Teeth 34 are arranged in pairs the members of which are diametrically opposite each other with relation to the shaft 23 and radially disposed with relation to the said shaft. These teeth are provided at their inner end portions and at their opposite sides with recesses 35 which receive the inturned extremities 32 of the plates 30. Securing bolts 36 pass transversely through the plates 30 and the inner end portions of the teeth 34.

Throughout the series of soil engaging members mounted upon the shaft 23 the teeth of one set of soil engaging members are disposed at right angles to the teeth of the next adjacent set or sets and this relation is maintained throughout the entire series. The soil engaging members are located beyond the outer or rear edge of the moldboard 2 of the plow and consequently they are positioned directly over the path into which the furrow slice is turned by the said moldboard.

As the plow to which the attachment is applied moves in a forward direction and turns a furrow slice, the wheel 11 travels along the bottom of a furrow and the tractors 12 engage the bottom of the furrow and break the same, thereby serving as means for operating upon the sub-soil. As the wheel 11 rotates the shaft 10 rotates with the same which carries around the wheel 13. Inasmuch as the rollers 28 upon the pins 27 engage the wheel 13, the wheel 26 is rotated in the opposite direction from that in which the wheel 11 rotates. Therefore the shaft 23 is rotated so that its upper part moves rearwardly as the plow moves in a forward direction. The shaft 23 carries the teeth 34 around in the same direction and as the said teeth strike the furrow slice which is being turned by the moldboard 2, the material of the said slice is reduced so that the slice is effectually broken. As the teeth 34 strike the furrow slice the plates 30 to which they are atttached may give so that the plow and the attachment is not subjected to undue strain due to the impact of the teeth against the furrow slice. At the same time should the teeth strike rock or other obstruction the said plates 30 will give sufficiently to permit the teeth to pass over the obstruction without injury.

The object in providing the slots 7 in the plates 6 and 9 and also the slotted plate 21 is that the shaft 23 may be moved to a desired distance behind the axis of the shaft 10 and that the teeth 34 may operate at a desired depth in the furrow slice. By removing the wheels 13 and 26 and substituting others of different diameters, the shaft 23 may be rotated at any desired speed with relation to the rate of rotation of the shaft 10.

When it is desired to use the plow without the harrow attachment, all of the parts except the plates 6 and 9 may be removed and these plates may be retained upon the plow inasmuch as they are so positioned that they will not interfere with the operation of the plow when the same is used for turning the soil only. If desired an additional traction wheel 11 may be mounted upon the shaft 10, and in such case the traction wheels would be at the opposite side of the wheel 13 and a seat or seat post may be connected with the attachment or the plow so that the attachment may serve as an ordinary harrow cart.

Having thus described the invention, what is claimed as new is:

1. The combination with a turning plow comprising a land-side and a mold-board, of vertically disposed supporting plates secured to the land-side and the mold-board, a bar supported above said plates and extending laterally beyond the mold-board, a shaft journaled in the said plates and having its outer end supported by the said bar, soil-engaging implements carried by said shaft laterally beyond the mold-board, a traction wheel mounted between the said plates, and gearing between said traction wheel and said shaft whereby the shaft and the ground-treating implements thereon will be rotated in a direction contrary to the rotation of the traction wheel.

2. The combination with a turning plow comprising a land-side, a mold-board and handles projecting rearwardly therefrom, of supporting plates secured to the land-side and the mold-board in rear of the same, a bar secured to the handles and extending laterally beyond the same and the mold-board, a plate adjustably secured to the outer end of the said bar, a shaft having one end journaled in the said plate and equipped with bearings adjustably mounted in the plates secured to the mold-board and the land-side respectively, a driving shaft journaled in the lower portions of said plates, a traction wheel on said shaft, a gear wheel on said shaft, and a crown wheel on the first-mentioned shaft meshing directly with the said gear wheel.

In testimony whereof, I affix my signature in presence of two witnesses.

ALFRED L. GARLOUGH. [L. S.]

Witnesses:
 H. M. NORTON,
 ARCHIBALD EMERSON.

Copies of this patent may be obtained for five cents each, by addressing the "Commissioner of Patents, Washington, D. C."